US012549321B2

(12) United States Patent
Murthy et al.

(10) Patent No.: US 12,549,321 B2
(45) Date of Patent: Feb. 10, 2026

(54) MIGRATING WIRELESS COVERAGE AMONG ACCESS POINTS

(71) Applicant: Dell Products, L.P., Round Rock, TX (US)

(72) Inventors: Prashanth Murthy, Plano, TX (US); Satish Venkob, Mississauga (CA); Hemant Kumar Bhawarlal Jain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 18/487,731

(22) Filed: Oct. 16, 2023

(65) Prior Publication Data

US 2025/0125937 A1 Apr. 17, 2025

(51) Int. Cl.
*H04L 5/00* (2006.01)
*H04W 36/22* (2009.01)
*H04W 88/08* (2009.01)

(52) U.S. Cl.
CPC ........... *H04L 5/0096* (2013.01); *H04W 36/22* (2013.01); *H04W 88/085* (2013.01)

(58) Field of Classification Search
CPC ..................................................... H04L 5/0096
See application file for complete search history.

(56) References Cited

U.S. PATENT DOCUMENTS

2024/0236920 A1* 7/2024 Bao ........................ G01S 5/0036

OTHER PUBLICATIONS

"5G; NR; Radio Resource Control (RRC); Protocol specification (3GPP TS 38.331 version 17.0.0 Release 17)" ETSI TS 138 331 V17.0.0, May 2022, 1197 pages.
"O-RAN Working Group 4 (Open Fronthaul Interfaces WG) Control, User and Synchronization Plane Specification" O-RAN.WG4.TS.CUS.0-R004-v18.00, 2025, 561 pages.

* cited by examiner

*Primary Examiner* — Pamit Kaur
(74) *Attorney, Agent, or Firm* — Amin, Turocy & Watson, LLP

(57) ABSTRACT

The technologies described herein are generally directed toward migrating wireless coverage among access points. In an embodiment, a method can include identifying a first network function of a network provided by first network equipment, with the first network function serving a resource grid of a geographic area, and with the resource grid being designated to serve a selected user equipment in the geographic area. The method can further include instantiating a second network function of the network at second network equipment, with the second network function serving a first subset of the resource grid. Further, the method can include designating the first network function to serve a second subset of the resource grid, different from the first subset of the resource grid. The method can further include designating the second network function to serve, after connection of the selected user equipment, the second subset of the resource grid.

20 Claims, 11 Drawing Sheets

600

610 620

| Bit | Short Message |
|---|---|
| 1 | ***systemInfoModification***<br>If set to 1: indication of a BCCH modification other than SIB6, SIB7 and SIB8. |
| 2 | ***etwsAndCmasIndication***<br>If set to 1: indication of an ETWS primary notification and/or an ETWS secondary notification and/or a CMAS notification. |
| 3 | ***stopPagingMonitoring***<br>This bit can be used for only operation with shared spectrum channel access and if *nrofPDCCH-MonitoringOccasionPerSSB-InPO* is present.<br>If set to 1: indication that the UE may stop monitoring PDCCH occasion(s) for paging in this Paging Occasion as specified in TS 38.304 [20], clause 7.1. |
| 4 | ***systemInfoModification-eDRX***<br>If set to 1: indication of a BCCH modification other than SIB6, SIB7 and SIB8. This indication applies only to UEs using eDRX cycle longer than the BCCH modification period. |
| 5 | ***systemInfoModification-BWPChange***<br>If set to 1: indication of a SIB1 modification to reconfigure initial |

MIGRATING WIRELESS COVERAGE AMONG ACCESS POINTS

BACKGROUND

Modern communication networks can deploy different network functions across a variety of computer hardware. Problems can occur when, notwithstanding the virtual operation of some network functions, these functions and the traffic handled by these functions, cannot be migrated without affecting network performance.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to identifying a first network function of a network provided by first network equipment, with the first network function serving a resource grid of a geographic area, and with the resource grid being designated to serve a selected user equipment in the geographic area. The instructions can further include an instruction to instantiating a second network function of the network at second network equipment, with the second network function serving a first subset of the resource grid. Further, the instructions can include an instruction to designating the first network function to serve a second subset of the resource grid, different from the first subset of the resource grid. The instructions can further include an instruction to designating the second network function to serve, after connection of the selected user equipment, the selected user equipment using the second subset of the resource grid.

Additionally, or alternatively, the instructions can further include designating the second network function to serve new active connections by other user equipment within the geographic area other than the selected user equipment, using the second subset of the resource grid. Additionally, or alternatively, the instructions can further include, based on a determination that the first network function has ceased to be designated to serve any user equipment, deactivating, by the controller equipment, the first network function. Additionally, or alternatively, the instructions can further include, after deactivating the first network function, designating the second network function to serve a larger portion of the resource grid, up to and including all of the resource grid.

Additionally, or alternatively, instantiating the second network function was initiated based on a maintenance requirement associated with the first network equipment. Additionally, or alternatively, the first network function can include a virtualized function comprising an open distributed unit function. Additionally, or alternatively, instantiating the second network function was initiated based on a request to change an operating state of the first network equipment. Additionally, or alternatively, the first network function can include a virtualized function comprising an open distributed unit function.

Additionally, or alternatively, the resource grid can include a set of common resource blocks comprising the first subset of the resource grid and the second subset of the resource grid. Additionally, or alternatively, the first subset of the set of common resource blocks and the second subset of the set of common resource blocks can include non-overlapping bandwidth parts.

Additionally, or alternatively, the first network equipment can include access point equipment. Additionally, or alternatively, the selected user equipment was selected based on being a user equipment in idle mode, and can include designating the second network function to serve the idle user equipment comprises using a reselecting process to switch the user equipment in idle mode from the first network equipment to the second network equipment.

Additionally, or alternatively, the selected user equipment was selected based on being an inactive user equipment, and designating the second network function to serve the inactive user equipment can include redirecting the inactive user equipment from the first network equipment to the second network equipment. Additionally, or alternatively, the selected user equipment was selected based on being determined to have a level of activity of communications at equal to or above a threshold of activity, and designating the second network function to serve the selected user equipment can include performing a handover of the selected user equipment between the first network equipment and the second network equipment.

Additionally, or alternatively, the selected user equipment was selected based on being determined to have connected to the network with a level of activity of communications at equal to or below a threshold of activity, and designating the second network function to serve the selected user equipment can include redirecting the selected user equipment from the first network equipment to the second network equipment. Additionally, or alternatively, the second network equipment was selected for instantiation of the second network function based on cell planning data representative of neighbor cell planning guidelines for the geographic area.

As described herein, an example method can include identifying a first network function of a network provided by first network equipment, with the first network function serving a resource grid of a geographic area, and with the grid of resource blocks being designated to serve a selected user equipment in the geographic area. The method can further include instantiating a second network function of the network at second network equipment, with the second network function serving a first subset of the grid of resource blocks. Further, the method can include designating the first network function to serve a second subset of the resource grid, different from the first subset of the grid of resource blocks. The method can further include designating the second network function to serve, after connection of the selected user equipment, the selected user equipment using the second subset of the grid of resource blocks.

Additionally, or alternatively, the first subset of the grid of resource blocks and the second subset of the grid of resource blocks can include non-overlapping bandwidth parts. Additionally, or alternatively, the selected user equipment was selected based on being an inactive user equipment, and wherein allocating the first distributed unit function to the inactive user equipment comprises redirecting the inactive user equipment from the second network equipment to the first network equipment.

An example non-transitory computer-readable medium can include instructions that, in response to execution, cause a system including a processor to perform operations. These operations can include identifying a first network function of a network provided by first network equipment, with the first network function serving a resource grid of a geographic area, and with the resource grid being designated to serve a selected user device in the geographic area. The operations can further include instantiating a second network function of the network at a second network device, with the second network function serving a first subset of the resource grid. The operations can further include designating the first network function to serve a second subset of the resource grid, different from the first subset of the resource grid. The operations can further include designating the second network function to serve, after connection of the selected user device, the selected user device using the second subset of the resource grid.

Additionally, or alternatively, the selected user device was selected based on the selected user device being in an idle state, and wherein designating the second virtual function to serve the selected user device comprises using a reselecting process to switch the selected user device from the first network device to the second network device. Additionally, or alternatively, the selected user device was selected based on the selected user device being in an inactive state, and wherein designating the second virtual function to serve the selected user device comprises redirecting the selected user device from the first network device to the second network device.

Additionally, or alternatively, the selected user device was selected based on being connected to the network and based on communication activity by the selected user device being equal to or above a first threshold of activity, and wherein designating the second virtual function to serve the selected user device comprises transferring the selected user device from being connected to the network via the first network device to being connected to the network via the second network device.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 depicts a table with an example use of system information messaging to relay instructions and information regarding the implementation of one or more embodiments.

DETAILED DESCRIPTION

Generally speaking, one or more embodiments described herein can facilitate migrating wireless coverage among access points (APs). As is understood by one having skill in the relevant art(s), given the description herein, the implementation(s) described herein are non-limiting examples, and variations to the technology can be implemented. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed. For instance, even though many examples described herein discuss virtualized network functions (e.g., central unit (CU) and distributed unit (DU)) being implemented at access points, the technologies described herein can be used in many applicable circumstances, e.g., with separate service equipment hosting some combination of functions with other network equipment, e.g., wireless access points. The CU and DU functions described herein can be implemented using a Next Generation NodeB, e.g., gNB-CU and gNB-DU.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
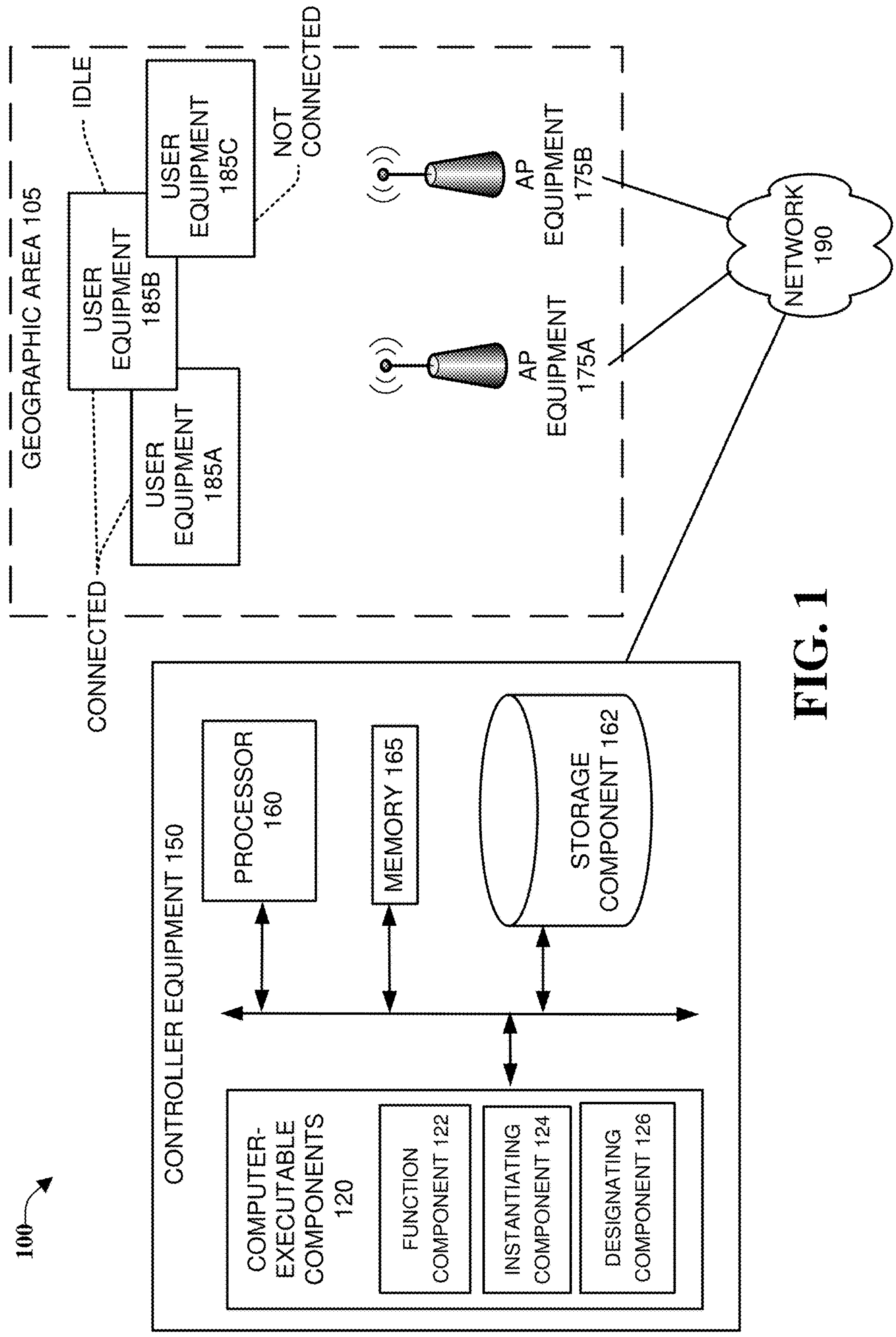
FIG. 1 is an architecture diagram of an example system that can facilitate migrating wireless coverage among access points, in accordance with one or more embodiments.

FIG. 1 is an architecture diagram of an example system 100 that can facilitate migrating wireless coverage among access points, in accordance with one or more embodiments. For purposes of brevity, description of like elements and/or processes employed in other embodiments is omitted. As depicted, system 100 includes controller equipment 150 connected to AP equipment 175A-B in geographic area 105 via network 190. As depicted, user equipment 185A-C are also in geographic area 105 with AP equipment 175A-B.

To facilitate the explanation of various combinations of features herein, user equipment 185A is in a state of being connected to AP equipment 185A (e.g., the level of activity associate with this connected state can vary in different examples described herein). AP equipment 185B is designated as being in an idle state. One having skill in the relevant art(s), given the description herein, understands that this state allows a device that is not currently being used for connection to the network to nonetheless retain some level of contact with the network, e.g., to facilitate rapid connections by user equipment 185B when required. In addition, user equipment 185C is labeled as being inactive, e.g., not actively connected or in an idle state. These states are discussed further below with other examples.

As depicted controller equipment 150 includes memory 165, processor 160, and storage component 162. According to multiple embodiments, memory 165 of controller equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include function component 122, instantiating component 124, designating component 126, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1104 of FIG. 11. Such examples of processor 160 can be employed to implement any embodiments of the subject disclosure.

As discussed further with FIG. 11 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1106 and FIG. 11. Such examples of memory 165 can be employed to implement any embodiments of the subject disclosure. In some embodiments, memory 165 can comprise non-volatile random-access memory (NVRAM).

It is understood that the computer processing systems, computer-implemented methods, apparatus, and computer program products described herein employ computer hardware and/or software to solve problems that are highly technical in nature (e.g., migrating combinations of virtualized network functions among different network devices, that are not abstract and cannot be performed as a set of mental acts by a human. For example, a human, or even a plurality of humans, cannot efficiently select between various network equipment, in various states of operating, to improve the operation of different virtual and physical network components.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of function component 122, which can in some implementations can identify a first network function of a network provided by first network equipment, with the first network function serving a resource grid of a geographic area, and with the resource grid being designated to serve a selected user equipment in the geographic area. For example, in one or more embodiments, function component 122 can identify a first network function (e.g., DU functions) of a network provided by first network equipment (AP equipment 175A), with the first network function serving a resource grid of geographic area 105, and with the resource grid being designated to serve a selected user equipment (e.g., user equipment 185A-C) in the geographic area.

In another example, memory 165 can store executable instructions that can facilitate generation of instantiating component 124, which can, in some implementations instantiate a second network function of the network at second network equipment, with the second network function serving a first subset of the resource grid. For example, one or more embodiments, instantiating component 124 can instantiate a second network function (e.g., DU 325B supplementing DU 325A) of the network at second network equipment (e.g., AP equipment 175B), with the second network function serving a first subset of the resource grid.

In another example, memory 165 can store executable instructions that can facilitate generation of designating component 126, which can, in some implementations designate the first network function to serve a second subset of the resource grid, different from the first subset of the resource grid. For example, one or more embodiments, designating component 126 can designate the first network function to serve a second subset of the resource grid, different from the first subset of the resource grid.

In another example, memory 165 can store executable instructions that can cause designating component 126 to further designate the second network function to serve, after connection of the selected user equipment, the selected user equipment using the second subset of the resource grid. For example, one or more embodiments, designating component 126 can further designate the second network function to serve, after connection of the selected user equipment, the selected user equipment using the second subset of the resource grid.

Additionally, or alternatively, in an example, user equipment 185B was selected based on being user equipment in an idle mode. In this example, in some implementations, some of the operations described above as being performed by designating component 126 can be executed by utilizing a reselecting process to switch the user equipment in idle mode from being served by AP equipment 175A to AP equipment 175B.

Additionally, or alternatively, in another example, user equipment 185C was selected based on being user equipment in an inactive mode. In this example, in some implementations, some of the operations described above as being performed by designating component 126 can be executed by utilizing a redirecting process to switch the connected user equipment from being served by AP equipment 175A to AP equipment 175B.

Additionally, or alternatively, in another example, user equipment 185A was selected based on being user equipment actively connected AP equipment 175A. In this example, in some implementations, some of the operations described above as being performed by designating component 126 can be executed by utilizing a handover process to switch the connected user equipment from being served by AP equipment 175A to AP equipment 175B. For example, different embodiments can utilize one or both of F1 handover and E1 handover procedures to manage the migration of user equipment in embodiments described herein.

In a variation of the example of active user equipment 185A, in some circumstances a level of activity in the connection may be less than a threshold level of activity (e.g., radio resource control (RRC) activity), e.g., a data operation such as a download does not have the low network latency requirements of other levels/types of activities such as voice connections. In some circumstances, for low activity connections, the redirecting network process discussed with the inactive user equipment 185C can also be used. In some implementations, this redirection can be caused by manipulating absolute radio frequency channel numbers (ARFCN) of the target user equipment.

It should be noted that the above techniques to switching connectivity between the original access point equipment 175A and the instantiated access point equipment 175B are non-limiting examples, and various states can use combinations of the approaches described above and/or other approaches to facilitate different aspects of embodiments described herein. For example, additionally, or alternatively, AP equipment 175B was selected for instantiation of the second network function based on cell planning data representative of neighbor cell planning guidelines for the geographic area.

It is appreciated that the embodiments of the subject disclosure depicted in various figures disclosed herein are for illustration only, and as such, the architecture of such embodiments are not limited to the systems, devices, and/or components depicted therein. For example, in some embodiments, controller equipment 150 can further comprise various computer and/or computing-based elements described herein with reference to operating environment 1100 and FIG. 11. In one or more embodiments, such computer and/or computing-based elements can be used in connection with implementing one or more of the systems, devices, components, and/or computer-implemented operations shown and described in connection with FIG. 1 or other figures disclosed herein.

It should be noted that controller equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as controller equipment 150. For example, one or more of controller equipment 150, and other equipment discussed herein can all be separate subsystems running in the kernel of a computing device as well as operating on separate network equipment, e.g., as depicted in FIG. 1.

Figure 2:
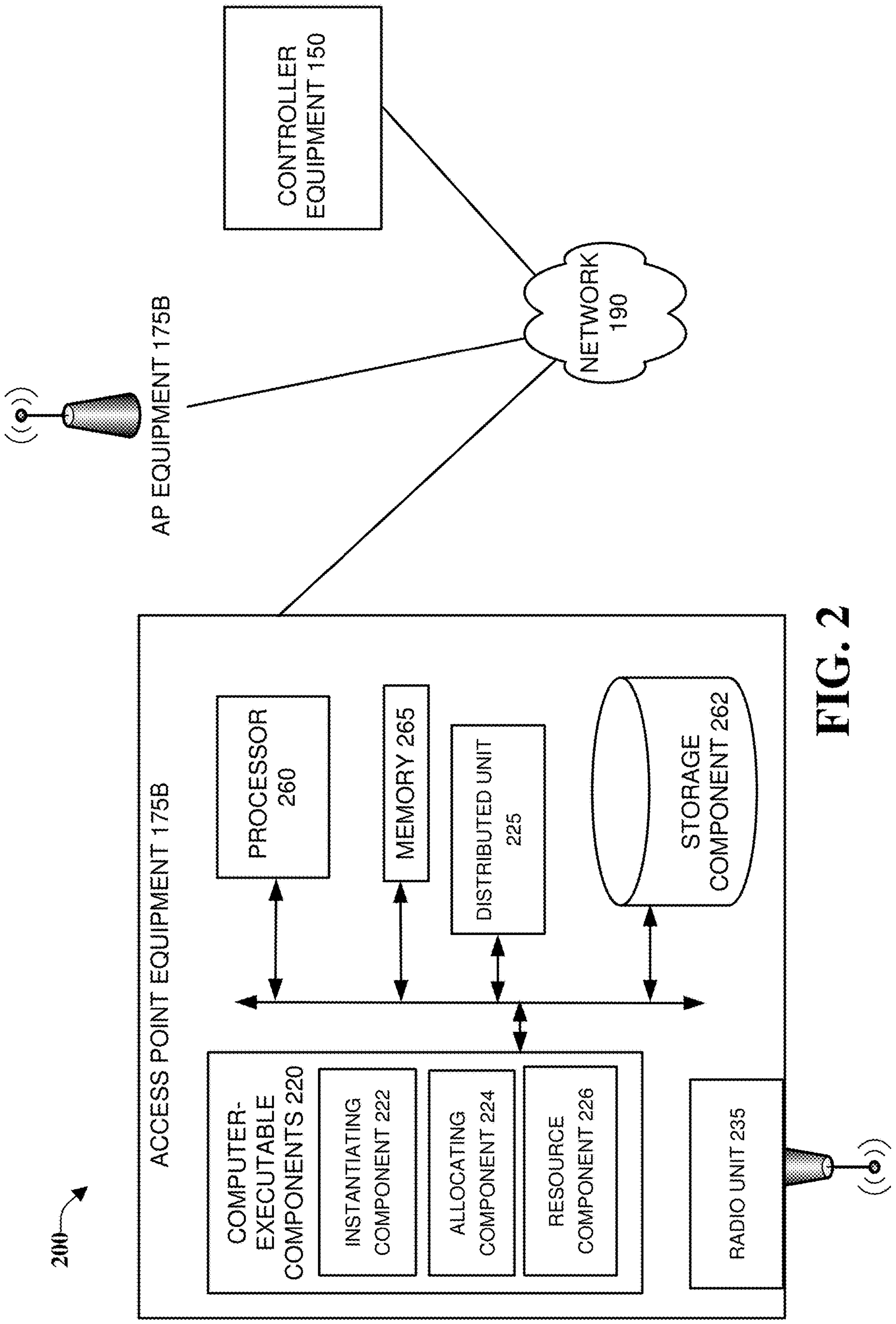
FIG. 2 is an architecture diagram of an example system that can facilitate migrating wireless coverage among access points, in accordance with one or more embodiments.

FIG. 2 is an architecture diagram of an example system 200 that can facilitate migrating wireless coverage among access points, in accordance with one or more embodiments. For purposes of brevity, description of like elements and/or processes employed in other embodiments is omitted. As depicted, system 200 includes AP equipment 175A connected to controller equipment 150, and AP equipment 175A via network 190.

As depicted, AP equipment 175B can include processor 260 (e.g., similar to processor 160) and storage device 262 (e.g., similar to storage component 162). According to multiple embodiments, AP equipment 175B (also termed 'second network equipment' for some embodiments herein) can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable components, including instantiating component 222, allocating component 224, resource component 226, and other components described or suggested by different embodiments described herein, that can facilitate and improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of AP equipment 175B, memory 265 can store executable instructions that can facilitate generation of instantiating component 222, which in some implementations, can instantiate a first distributed unit function of a network, wherein the first distributed unit function serves a first subset of a grid of resource blocks. For example, in one or more embodiments, access point equipment 175B can instantiate a first distributed unit function of a network, with the first distributed unit function serving a first subset of a grid of resource blocks.

In an additional example implementation of AP equipment 175B, memory 265 can store executable instructions that can facilitate generation of allocating component 224, which in some implementations, can allocate the first distributed unit function to a selected user equipment, wherein the selected user equipment was previously served by a second distributed unit function provided by second network equipment using a second subset of the grid of resource blocks, and wherein, responsive to allocating the first distributed unit function to serve the selected user equipment, the second distributed unit function was deactivated. For example, in one or more embodiments, allocating component 224 can allocate the first distributed unit function to a selected user equipment, with the selected user equipment being previously served by a second distributed unit function (e.g., DU 325A) provided by second network equipment using a second subset of the grid of resource blocks, and, responsive to allocating the first distributed unit function to serve the selected user equipment, the second distributed unit function was deactivated.

In an additional example implementation of AP equipment 175B, memory 265 can store executable instructions that can facilitate generation of resource component 226, which in some implementations, can, responsive to deactivation of the first distributed unit function, expand utilization of the grid of resource blocks by the first distributed unit function to include the second subset of the grid of resource blocks. For example, in one or more embodiments, resource component 226 can, responsive to deactivation of the first distributed unit function, expand utilization of the grid of resource blocks by the first distributed unit function to include the second subset of the grid of resource blocks.

Figure 3:
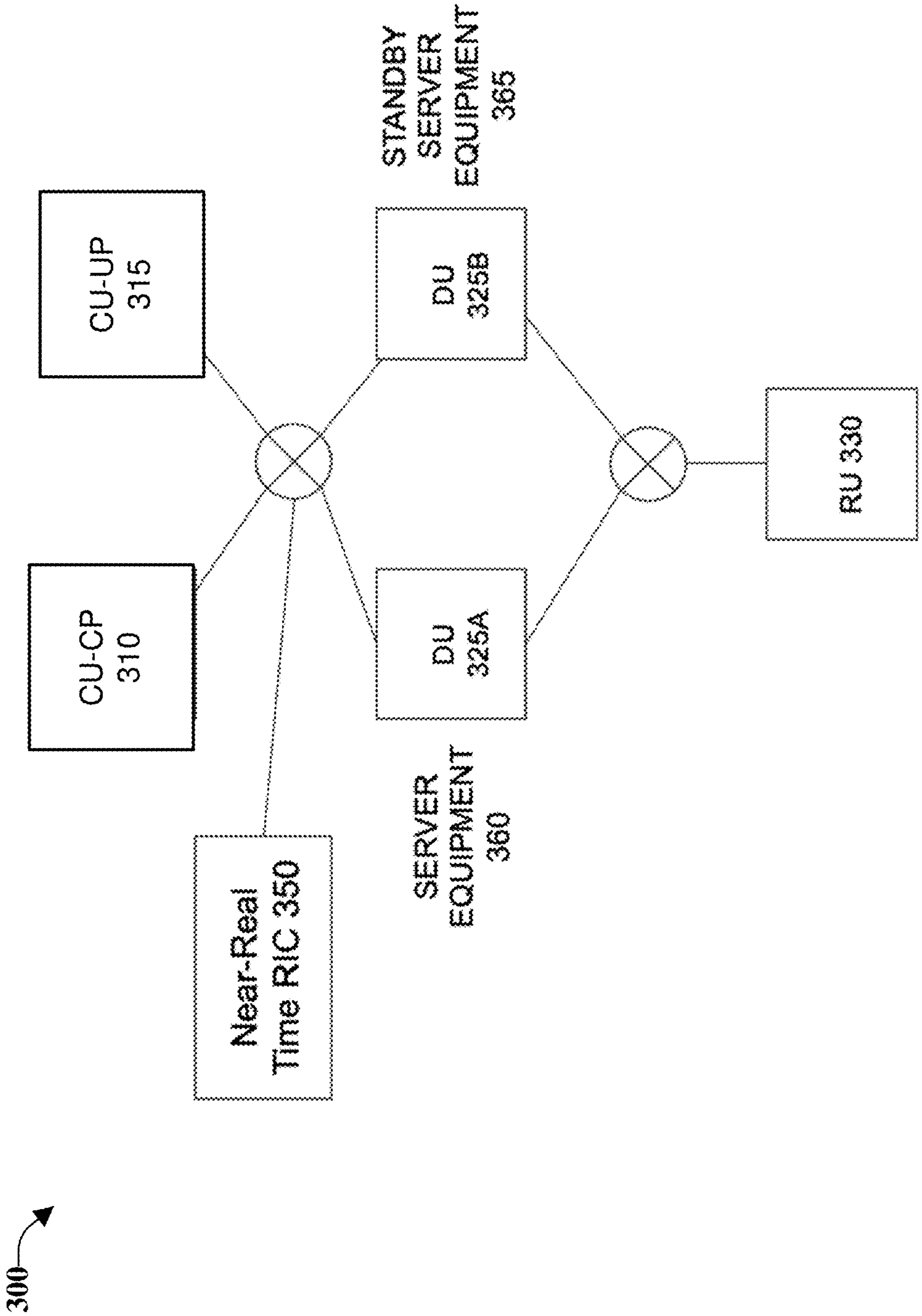
FIG. 3 is an architecture diagram of an example system that can facilitate migrating wireless coverage among access points, in accordance with one or more embodiments.

FIG. 3 is an architecture diagram of an example system 300 that can facilitate migrating wireless coverage among access points, in accordance with one or more embodiments. For purposes of brevity, description of like elements and/or processes employed in other embodiments is omitted. As depicted, system 300 includes open architecture centralized unit (O-CU) control plane (UP) 310, O-CU user plane (UP) 315, distributed units (DUs) 325A-B deployed at server equipment 360 and standby server equipment 365, respectively, and radio unit (RU) 330. For some examples described herein, near-real time (NR) RAN intelligent controller (RIC) 350 can also be termed controller equipment, such as controller equipment 150 described with FIGS. 1-2.

In this example implementation of an open network architecture, initially CU-CP 310 and CU-UP 315 are served by a virtualized DU 325A function, that is implemented (e.g., enables wireless connections) via RU 330. At this initial phase, server equipment 360 is operating and standby server equipment 365 is idle, e.g., as a standby server. Based on a requirement, one or more embodiments can reduce and or remove the service load from server equipment 360 and transfer this load to standby server equipment 365. Example requirements broadly include different reasons for performing this switch, e.g., load balancing, maintenance, outages, etc. For example, based on a requirement to change an operating state (e.g., power off, or otherwise reduce a load handled) of server equipment 360, by processes described herein, the load handled by server equipment 360 can be all or partially redistributed to standby server equipment 365.

In some circumstances, operations of embodiments described herein can handle the start/stop of network equipment for a variety of typical and special cases. Different benefits that can result from different approaches described herein include, but are not limited to, promoting high availability of distributed network functions, reducing downtime during hardware failures, retaining of capacity layers by migrating functions off of network equipment that cannot be practically shut down, improving the efficacy of power managing procedures during different network states, and improving the provision of services via coverage layers.

Figure 4:
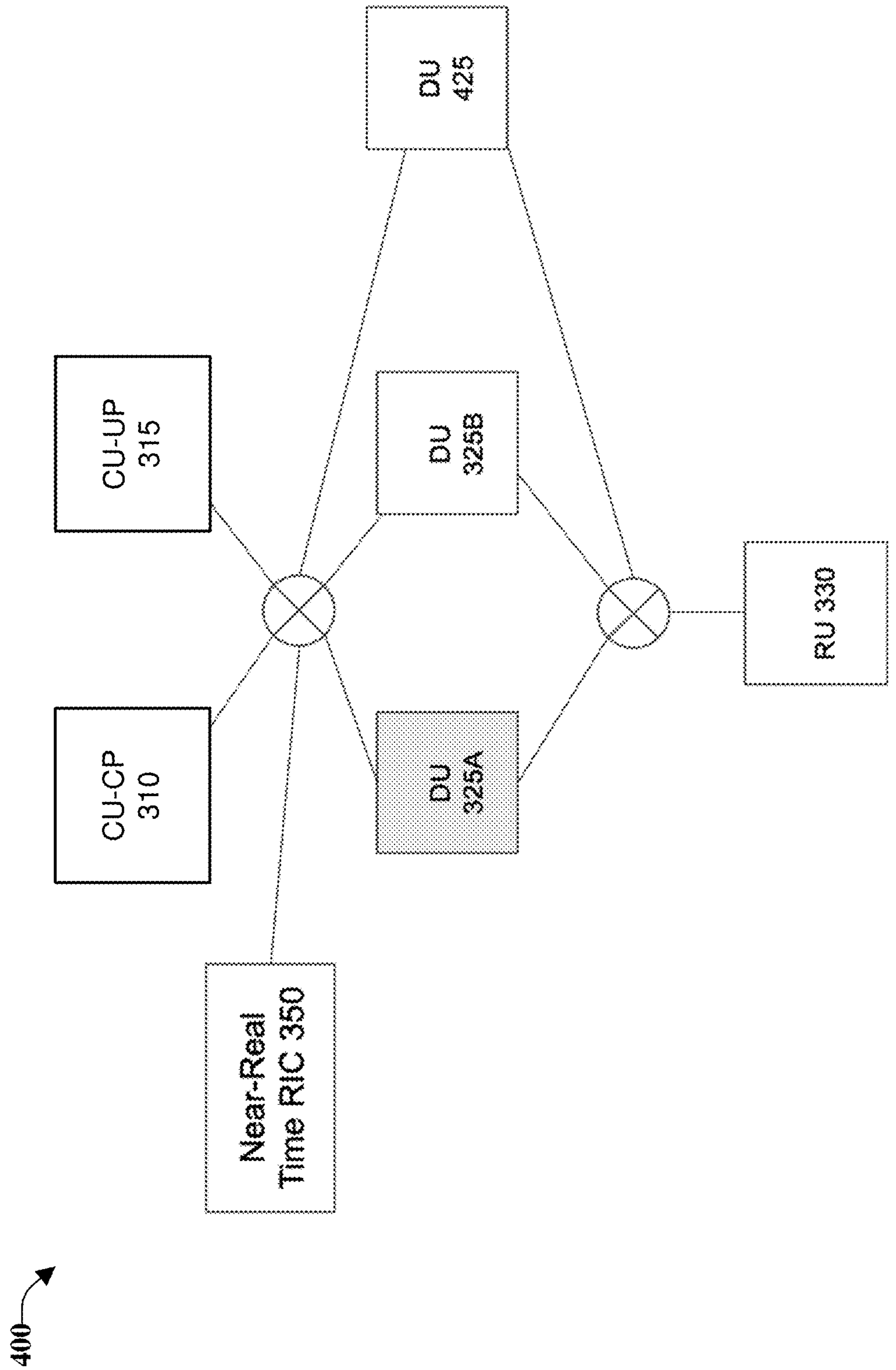
FIG. 4 is an architecture diagram of an example system that can facilitate migrating wireless coverage among access points, in accordance with one or more embodiments

FIG. 4 is an architecture diagram of an example system 400 that can facilitate migrating wireless coverage among access points, in accordance with one or more embodiments. For purposes of brevity, description of like elements and/or processes employed in other embodiments is omitted. As depicted, system 400 includes the components of FIG. 3 with the addition of a second DU 425.

In this example, the transfer of traffic to other DU virtualized functions at different network equipment can be performed whereby the traffic is distributed among two or more network devices. As described further below, the difference between a one to one transfer and a one to many transfer of load from DU 325A can include approaches to dividing and otherwise manipulating available wireless spectra.

In addition, as depicted in FIG. 4, in some implementations, once communications load has been removed from DU 325A, one or more embodiments can shut down server equipment 360, e.g., to perform one or more of the example requirements noted above, e.g., maintenance, etc.

Figure 5:
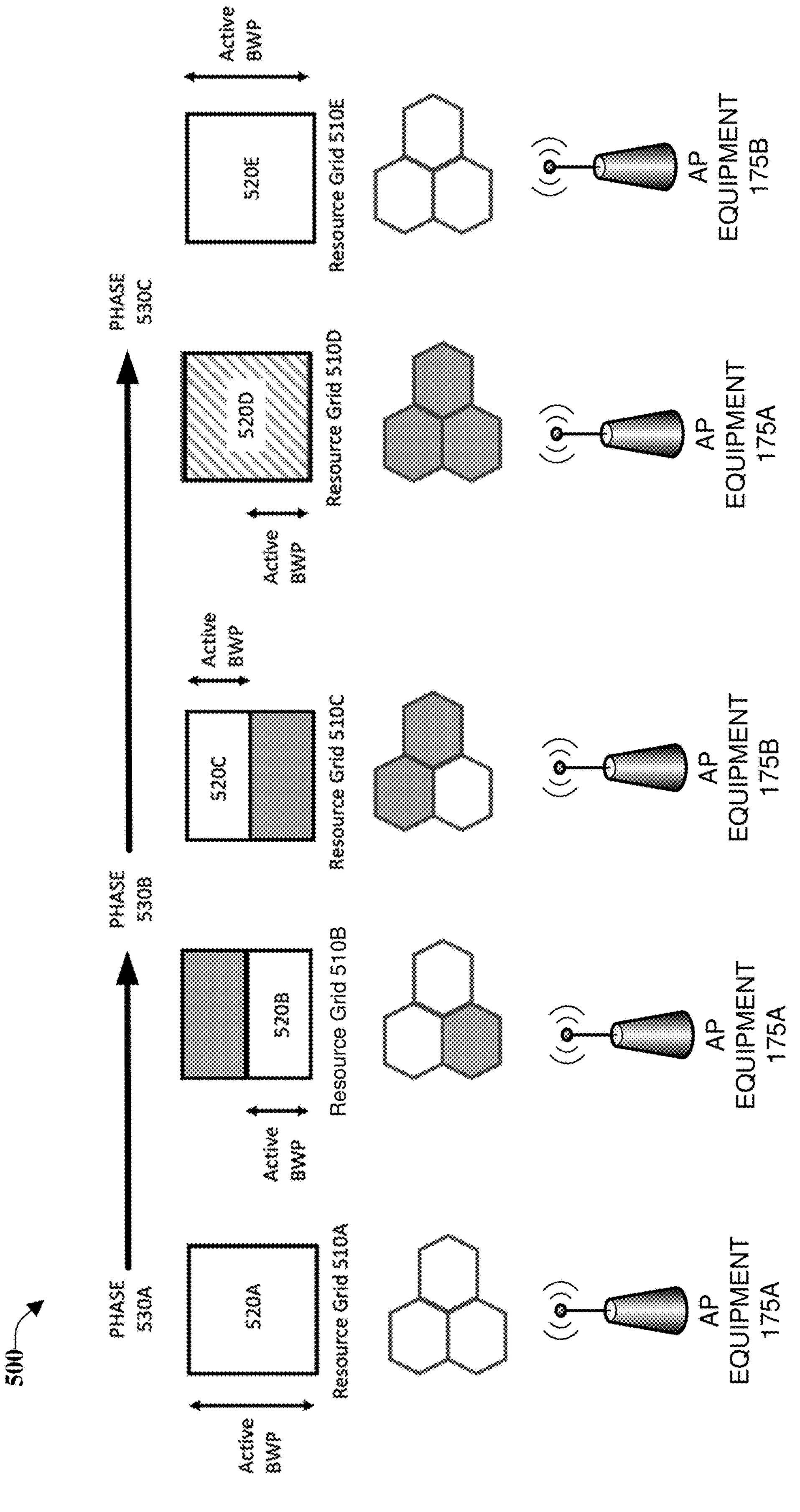
FIG. 5 is an architecture diagram of an example system that can facilitate migrating wireless coverage among access points, in accordance with one or more embodiments.

FIG. 5 is an architecture diagram of an example system 500 that can facilitate migrating wireless coverage among access points, in accordance with one or more embodiments. For purposes of brevity, description of like elements and/or processes employed in other embodiments is omitted. As depicted, system 500 includes phases 530A-C, with phase 530A depicting AP equipment 175A utilizing resource grid 510A, phase 530B depicting both AP equipment 175A-B respectively utilizing resource grids 510B-C, and phase 530C depicting both AP equipment 175A-B respectively utilizing resource grids 510B-C.

Returning to the example of FIGS. 1-2 above, in one or more embodiments, at phase 530A, function component 122 can identify function DU 325A operating at AP equipment 175A-B, with DU 325A operating by allocating and utilizing 520A resource grid 510A of a geographic area, e.g., geographic area 105. In this example, user equipment is not shown, but the example user equipment 185A-C described with FIG. 1 above can be referenced.

Based on a requirement, at phase 530B, to commence the transfer of communications load from DU 325A to DU 325B, resource grids 510B-C depict subsets of resource grid 510A, with active bandwidth part 520B being a part of resource grid 510B where traffic is being served by AP equipment 175A, and the darker region above, being a part of bandwidth of AP equipment that is not presently allocated to user equipment. In different implementations, the resource grids discussed can include a set of common resource blocks (CRBs).

Based on this lack of communications activity by the inactive portion of resource grid 520B, region 520C can be designated to a new or existing DU instance, e.g., DU 325B deployed on standby server equipment 365. Continuing this example, instantiating component 124 can instantiate a second network function (e.g., DU 325B) of the network at standby server equipment 365, with first subset of the resource grid being designated, e.g., subset 520C. Along with this designation, in one or more embodiments, designating component 126 can designate the first network function (e.g., DU 325) to serve a second subset 520B of the resource grid, different from the first subset of the resource grid, e.g., the resource grids discussed herein can include a set of common resource blocks (CRBs) in which the designated subsets 520B-C include non-overlapping bandwidth parts.

In some embodiments, this designation can broadly include distributing available bandwidth to be used by user equipment in various states, e.g., user equipment 185A-C above. Thus, in this example, new and existing connections can be handled by DU 325B at standby server equipment 365, with this, in some circumstances, leading to a gradual reduction in the amount of traffic being served by DU 325A.

Continuing this example, at phase 530C, based on a determination that DU 325A has ceased to be designated to serve any user equipment, the virtualized function DU 325A, and/or the equipment upon which the function is deployed (e.g., server equipment 360), can be deactivated and/or shut down. As depicted in FIG. 5, this can result in an expansion into resource grid 520E of the available bandwidth designated for DU 325B up to and including all of the bandwidth previously allocated to DU325A, with this bandwidth being removed from resource grid 520D designated to AP equipment 175A. In embodiments, different approaches can provide a group switching for bandwidth allocated to all user equipment in an area. In this example, based on its previous load being reallocated, DU325A can be powered off.

FIG. 6 depicts a table with an example 600 use of system information messaging to relay instructions and information regarding the implementation of one or more embodiments. This example is non-limiting, and other approaches can be used to facilitate these and similar operations, in accordance with one or more embodiments. For purposes of brevity, description of like elements and/or processes employed in other embodiments is omitted.

As depicted, example 600 includes a description of the use of bits 610 to provide Short Messages 620 to reference System Information Block type 1 (SIB1) message information, as further described below. SIB1 blocks can be used to communicate system information used by mobile devices to communicate with the wireless network, including, but not limited to, cell access-related parameters, cell selection/reselection parameters, and other control information that can be used by access points and mobile devices for operation within the network.

In one or more implementations, as described with FIGS. 3-5 above, one or more embodiments can distribute and redistribute available bandwidth to be used by user equipment in various states, e.g., with new and existing connections can be handled by DU 325B at standby server equipment 365, with this, in some circumstances, leading to a gradual reduction in the amount of traffic being served by DU 325A.

In one or more embodiments, one approach that can be used to change bandwidth allocations can use RRC reconfiguration or Downlink Control Information (DCI) based switching to send individual messages to each mobile device. An alternative approach that can also be used by one or more embodiments can use a short message that is commonly used to update System Information within the cell.

Example 600 describes example short messages 620 that can be transmitted on a Physical Downlink Control Channel (PDCCH) using a Paging Radio Network Temporary Identifier (P-RNTI) with or without an associated paging message using the Short Message field in a DCI format. One or more embodiments can enable the use of example bit 630 (5) shown (also termed the systemInfoModification-BWPChange bit), which can indicate that the Initial Bandwidth Parts (BWP) have changed for associated mobile devices, and instructs the mobile devices to reconfigure their existing active and default BWPs to the Initial BWP configured in SIB1.

Figure 7:
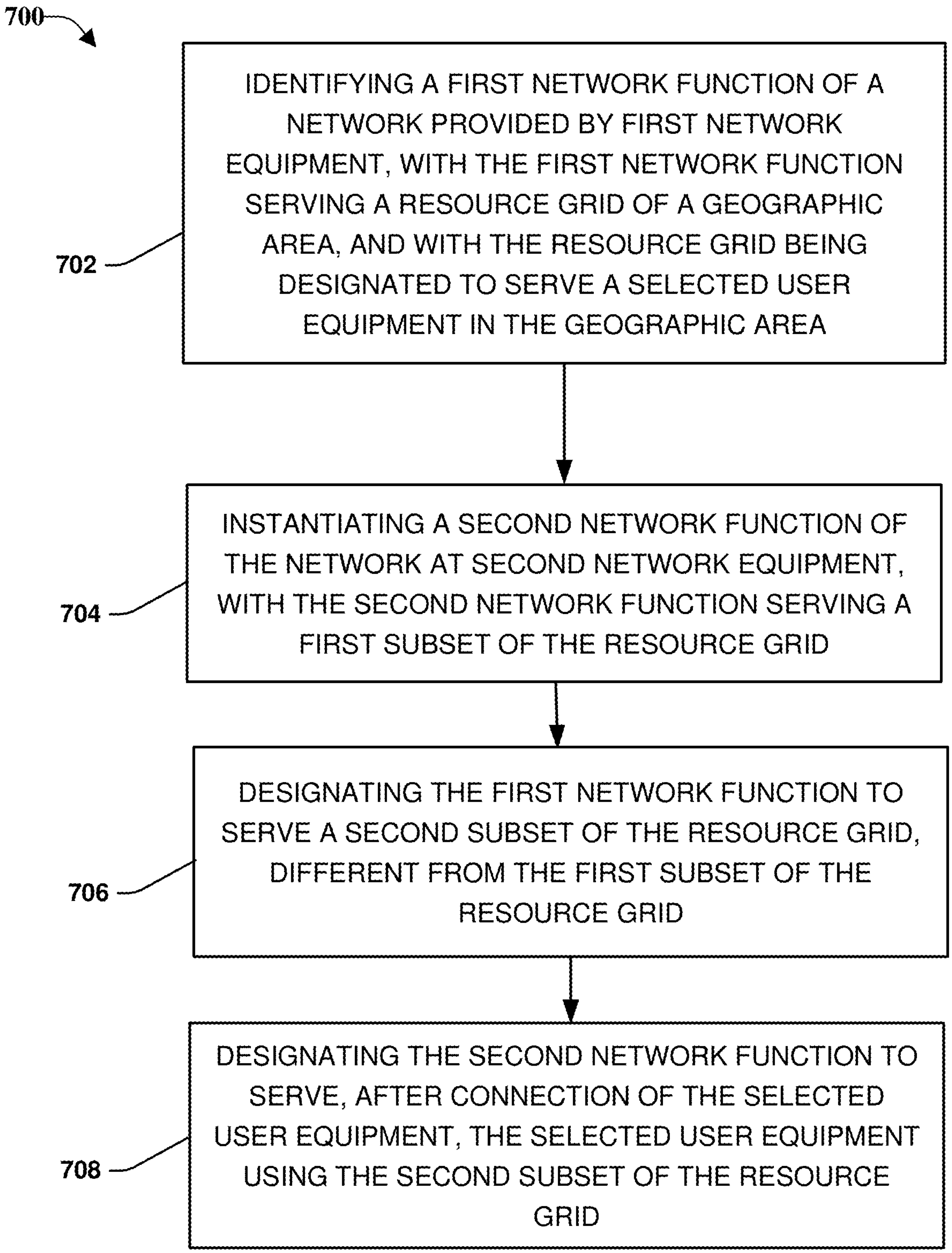
FIG. 7 depicts a flow diagram representing example operations of an example method that can facilitate migrating wireless coverage among access points, in accordance with one or more embodiments.

FIG. 7 depicts a flow diagram representing example operations of an example method 700 that can facilitate migrating wireless coverage among access points, in accordance with one or more embodiments. For purposes of brevity, description of like elements and/or processes employed in other embodiments is omitted.

In some examples, one or more embodiments of method 700 can be implemented by function component 122, instantiating component 124, designating component 126, and other components that can be used to implement aspects of method 700. in accordance with one or more embodiments. It is appreciated that the operating procedures of method 700 are example operating procedures, and that there can be embodiments that implement more or fewer operating procedures than are depicted, or that implement the depicted operating procedures in a different order than as depicted.

At 702 of method 700, function component 122 can, in one or more embodiments identifying a first network function of a network provided by first network equipment, with the first network function serving a resource grid of a geographic area, and with the resource grid being designated to serve a selected user equipment in the geographic area. At 704 of method 700, instantiating component 124 can, in one or more embodiments instantiating a second network function of the network at second network equipment, with the second network function serving a first subset of the resource grid. At 706 of method 700, designating component 126 can, in one or more embodiments designate the first network function to serve a second subset of the resource grid, different from the first subset of the resource grid. At 708 of method 700, designating component 126 can, in one or more embodiments further designate the second network function to serve, after connection of the selected user equipment, the selected user equipment using the second subset of the resource grid.

Figure 8:
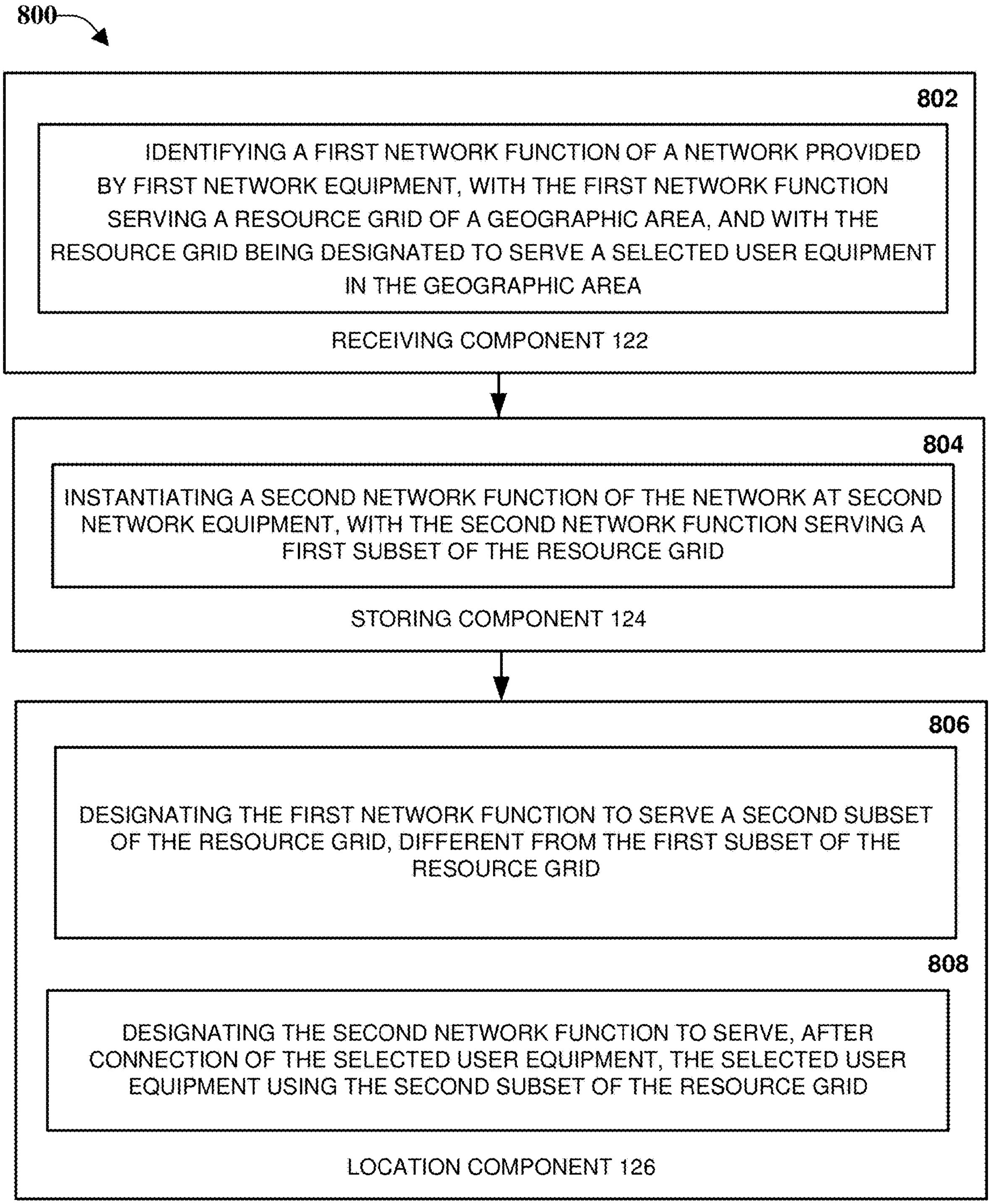
FIG. 8 depicts an example system that can facilitate migrating wireless coverage among access points, in accordance with one or more embodiments.

FIG. 8 depicts an example system 800 that can facilitate migrating wireless coverage among access points, in accordance with one or more embodiments. For purposes of brevity, description of like elements and/or processes employed in other embodiments is omitted. Example system 800 can include function component 122, instantiating component 124, designating component 126, and other components that can be used to implement aspects of system 900, as described herein, in accordance with one or more embodiments.

At 802 of FIG. 8, function component 122 can identify a first network function of a network provided by first network equipment, with the first network function serving a resource grid of a geographic area, and with the resource grid being designated to serve a selected user equipment in the geographic area, in accordance with one or more embodiments. At 804 of FIG. 8, instantiating component 124 can instantiate a second network function of the network at second network equipment, with the second network function serving a first subset of the resource grid. At 806 of FIG. 8, designating component 126 can designate the first network function to serve a second subset of the resource grid, different from the first subset of the resource grid. At 808 of FIG. 8, designating component 126 can further designate the second network function to serve, after connection of the selected user equipment, the selected user equipment using the second subset of the resource grid.

Figure 9:
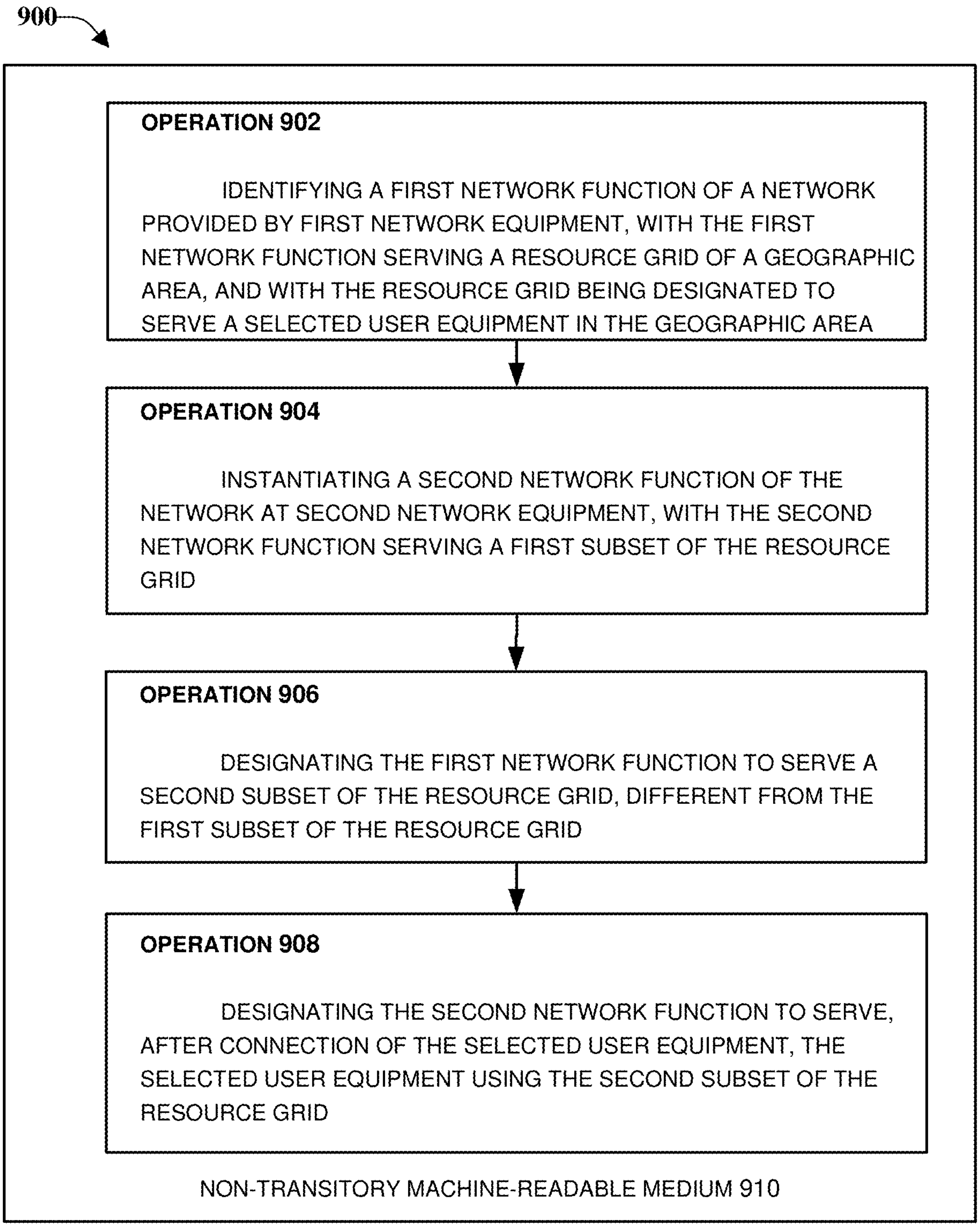
FIG. 9 depicts an example non-transitory machine-readable medium that can include executable instructions that, when executed by a processor of a system, can facilitate migrating wireless coverage among access points, in accordance with one or more embodiments.

FIG. 9 depicts an example 900 non-transitory machine-readable medium 910 that can include executable instructions that, when executed by a processor of a system, can facilitate migrating wireless coverage among access points, in accordance with one or more embodiments. For purposes of brevity, description of like elements and/or processes employed in other embodiments is omitted.

Operation 902 of FIG. 9 can facilitate generation of function component 122 which, in one or more embodiments, can identify a first network function of a network provided by first network equipment, with the first network function serving a resource grid of a geographic area, and with the resource grid being designated to serve a selected user equipment in the geographic area. Operation 904 of FIG. 9 can facilitate generation of instantiating component 124, which, in one or more embodiments, can instantiate a second network function of the network at second network equipment, with the second network function serving a first subset of the resource grid. Operation 906 of FIG. 9 can facilitate generation of designating component 126 which, in one or more embodiments can designate the first network function to serve a second subset of the resource grid, different from the first subset of the resource grid. Operation 908 of FIG. 9 can cause, in one or more embodiments, designating component 126 to further designate the second network function to serve, after connection of the selected user equipment, the selected user equipment using the second subset of the resource grid.

Figure 10:
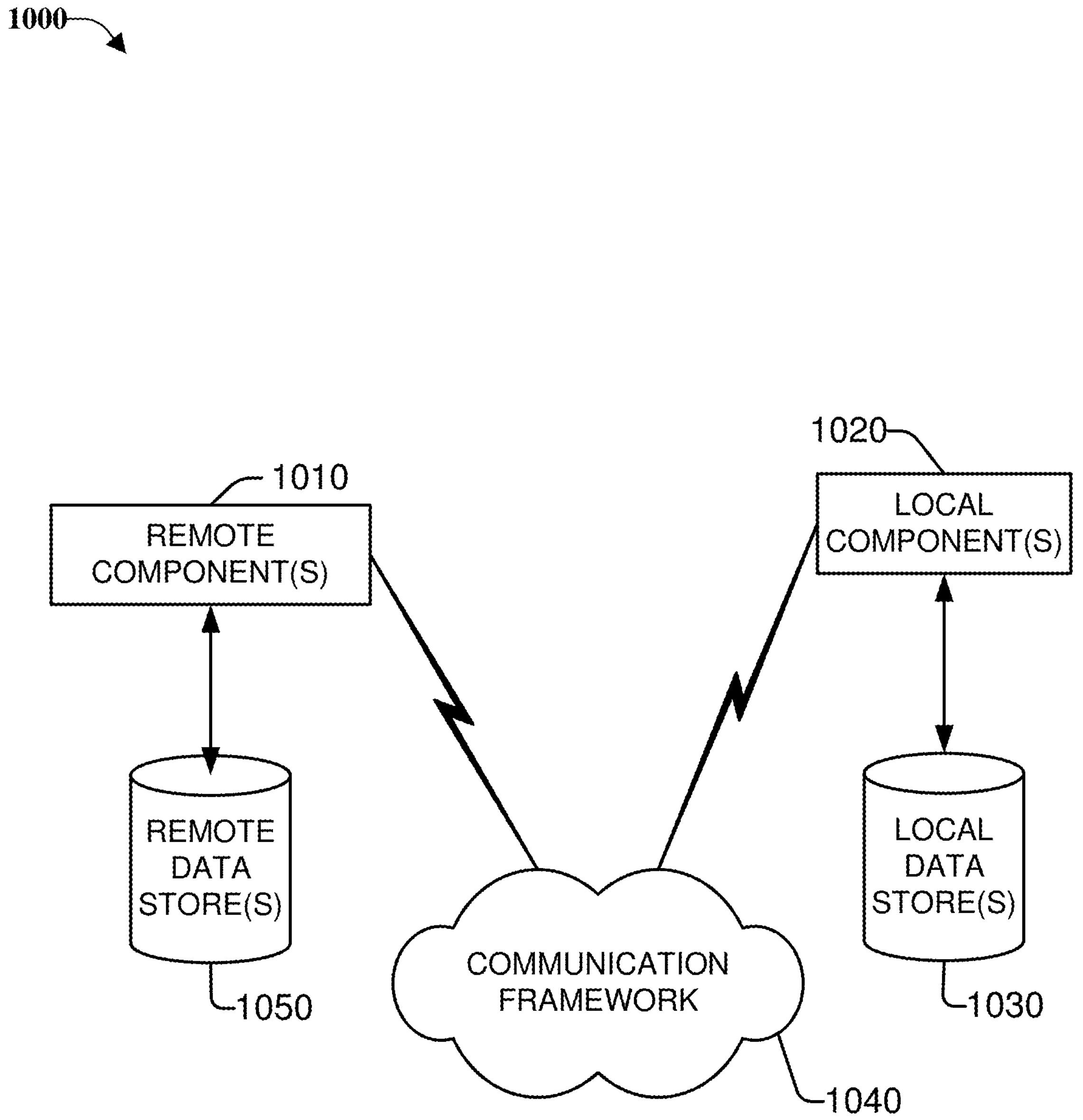
FIG. 10 depicts an example schematic block diagram of a computing environment with which the disclosed subject matter can interact, in accordance with one or more embodiments.

FIG. 10 is a schematic block diagram of a system 1000 with which the disclosed subject matter can interact, in accordance with one or more embodiments. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices).

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage." "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020, non-volatile memory 1022, disk storage 1024, and memory storage, e.g., local data store(s) 1030 and remote data store(s) 1050, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 11:
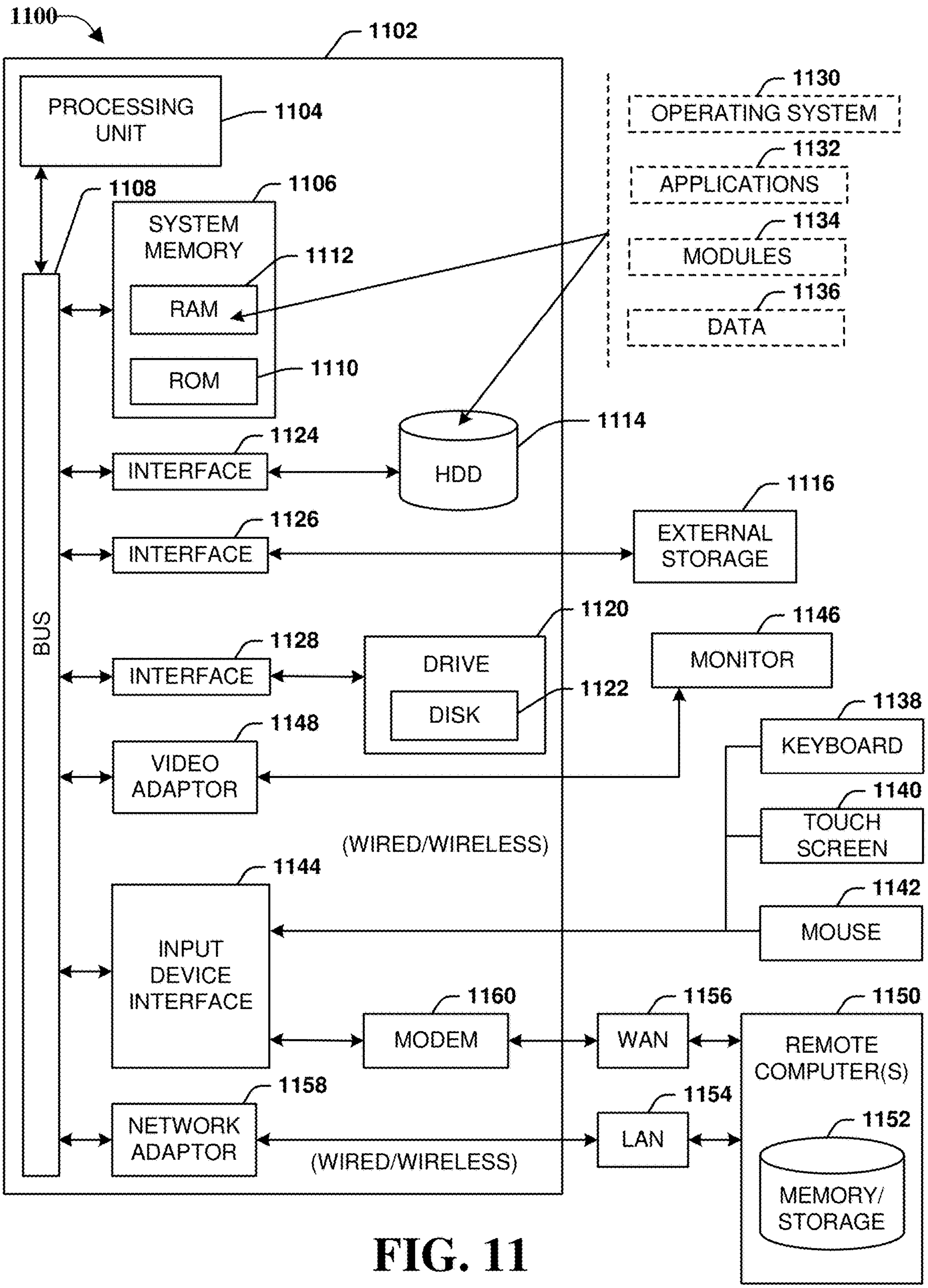
FIG. 11 illustrates an example block diagram of a computer operable to execute an embodiment of this disclosure.

Referring now to FIG. 11, in order to provide additional context for various embodiments described herein, FIG. 11 and the following discussion are intended to provide a brief, general description of a suitable computing environment 1100 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity. description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102. the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

identifying, by controller equipment comprising a processor, a first network function of a network provided by first network equipment, wherein the first network function serves a resource grid of a geographic area, and wherein the resource grid is designated to serve a selected user equipment in the geographic area;

facilitating, by the controller equipment, instantiating a second network function of the network at second network equipment, wherein the second network function serves a first subset of the resource grid;

designating, by the controller equipment, the first network function to serve a second subset of the resource grid, different from the first subset of the resource grid; and designating, by the controller equipment, the second network function to serve, after connection of the selected user equipment, the selected user equipment using the second subset of the resource grid.

2. The method of claim 1, further comprising:

designating, by the controller equipment, the second network function to serve new active connections by other user equipment within the geographic area other than the selected user equipment, using the second subset of the resource grid; and based on a determination that the first network function has ceased to be designated to serve any user equipment, deactivating, by the controller equipment, the first network function.

3. The method of claim 2, further comprising, after deactivating the first network function, designating, by the controller equipment, the second network function to serve a larger portion of the resource grid, up to and including all of the resource grid.

4. The method of claim 1, wherein instantiating the second network function was initiated based on a request to change an operating state of the first network equipment.

5. The method of claim 1, wherein the first network function comprises a virtualized function comprising an open distributed unit function.

6. The method of claim 1, wherein the resource grid comprises a set of common resource blocks comprising the first subset of the resource grid and the second subset of the resource grid.

7. The method of claim 6, wherein the first subset of the set of common resource blocks and the second subset of the set of common resource blocks comprise non-overlapping bandwidth parts.

8. The method of claim 1, wherein the first network equipment comprises access point equipment.

9. The method of claim 1, wherein the selected user equipment was selected based on being a user equipment in idle mode, and wherein designating the second network function to serve the idle user equipment comprises using a reselecting process to switch the user equipment in idle mode from the first network equipment to the second network equipment.

10. The method of claim 1, wherein the selected user equipment was selected based on being an inactive user equipment, and wherein designating the second network function to serve the inactive user equipment comprises redirecting the inactive user equipment from the first network equipment to the second network equipment.

11. The method of claim 1, wherein the selected user equipment was selected based on being determined to have a level of activity of communications at equal to or above a threshold of activity, and wherein designating the second network function to serve the selected user equipment comprises performing a handover of the selected user equipment between the first network equipment and the second network equipment.

12. The method of claim 1, wherein the selected user equipment was selected based on being determined to have connected to the network with a level of activity of communications at equal to or below a threshold of activity, and wherein designating the second network function to serve the selected user equipment comprises redirecting the selected user equipment from the first network equipment to the second network equipment.

13. The method of claim 1, wherein the second network equipment was selected for instantiation of the second network function based on cell planning data representative of neighbor cell planning guidelines for the geographic area.

14. First network equipment, comprising a processor; and a memory that stores executable instructions that, when executed by the processor, facilitate performance of operations, comprising:

instantiating a first distributed unit function of a network, wherein the first distributed unit function serves a first subset of a grid of resource blocks, allocating the first distributed unit function to a selected user equipment, wherein the selected user equipment was previously served by a second distributed unit function provided by second network equipment using a second subset of the grid of resource blocks, and wherein, responsive to allocating the first distributed unit function to serve the selected user equipment, the second distributed unit function was deactivated, and responsive to deactivation of the first distributed unit function, expanding utilization of the grid of resource blocks by the first distributed unit function to include the second subset of the grid of resource blocks.

15. The first network equipment of claim 14, wherein the first subset of the grid of resource blocks and the second subset of the grid of resource blocks comprise non-overlapping bandwidth parts.

16. The first network equipment of claim 14, wherein the selected user equipment was selected based on being an inactive user equipment, and wherein allocating the first distributed unit function to the inactive user equipment comprises redirecting the inactive user equipment from the second network equipment to the first network equipment.

17. A non-transitory machine-readable medium, comprising executable instructions that, when executed by a processor of a controller device, facilitate performance of operations, comprising:

identifying a first virtual function of a network enabled by a first network device, wherein the first virtual function serves a resource grid of a geographic area, and wherein the resource grid is designated to enable connectivity for a selected user device in the geographic area;

instantiating a second virtual function of the network at second network device, wherein the second virtual function serves a first subset of the resource grid;

designating the first virtual function to serve a second subset of the resource grid, different from the first subset of the resource grid; and designating the second virtual function to serve, responsive to connection by the selected user device, the selected user device using the second subset of the resource grid.

18. The non-transitory machine-readable medium of claim 17, wherein the selected user device was selected based on the selected user device being in an idle state, and wherein designating the second virtual function to serve the selected user device comprises using a reselecting process to switch the selected user device from the first network device to the second network device.

19. The non-transitory machine-readable medium of claim 17, wherein the selected user device was selected based on the selected user device being in an inactive state, and wherein designating the second virtual function to serve the selected user device comprises redirecting the selected user device from the first network device to the second network device.

20. The non-transitory machine-readable medium of claim 17, wherein the selected user device was selected based on being connected to the network and based on communication activity by the selected user device being equal to or above a first threshold of activity, and wherein designating the second virtual function to serve the selected user device comprises transferring the selected user device from being connected to the network via the first network device to being connected to the network via the second network device.

* * * * *